(12) United States Patent
Mechkovsky

(10) Patent No.: US 8,221,661 B2
(45) Date of Patent: Jul. 17, 2012

(54) GENERAL-PURPOSE METHOD FOR PRODUCING LARGE-SIZED CERAMIC PRODUCTS SUCH AS HOUSES OR ROOMS FROM CLAY, LARGE-SIZED BLOCKS, BRICKS, AND CEILING SLABS

(76) Inventor: Konstantin Igorevich Mechkovsky, Kaluzhskaya (RU)

( * ) Notice: Subject to any disclaimer, the term of this patent is extended or adjusted under 35 U.S.C. 154(b) by 411 days.

(21) Appl. No.: 12/518,947

(22) PCT Filed: Jun. 6, 2007

(86) PCT No.: PCT/RU2007/000303
§ 371 (c)(1),
(2), (4) Date: Jun. 15, 2009

(87) PCT Pub. No.: WO2008/076001
PCT Pub. Date: Jun. 26, 2008

(65) Prior Publication Data
US 2010/0081560 A1    Apr. 1, 2010

(30) Foreign Application Priority Data
Dec. 21, 2006 (RU) ................ 2006145545

(51) Int. Cl.
| C04B 33/00 | (2006.01) |
| B44F 7/00 | (2006.01) |
| B44F 9/00 | (2006.01) |
| E04C 1/00 | (2006.01) |
| B29C 65/00 | (2006.01) |
| B01D 67/00 | (2006.01) |
| B28B 1/00 | (2006.01) |
| B28B 5/00 | (2006.01) |

(52) U.S. Cl. ............ 264/41; 501/141; 501/145; 52/316; 264/48; 264/644; 264/680

(58) Field of Classification Search .......... 501/141–150; 428/141, 152, 155; 52/316; 164/11, 6, 9, 164/28, 17, 19, 20, 22; 264/680, 679, 677, 264/673, 666, 654, 653, 644, 637, 636, 635, 264/633, 632, 609, 41, 48
See application file for complete search history.

(56) References Cited

U.S. PATENT DOCUMENTS
5,198,164 A * 3/1993 Hayashi et al. ............... 264/606
(Continued)

FOREIGN PATENT DOCUMENTS
GB      2210681      6/1989
(Continued)

OTHER PUBLICATIONS

Ju.P. Sosnin. Bytovye pechi, kaminy i vodonagrevateli. Moscow. Stroiizdat, 1984, p. 61, figure 30.

*Primary Examiner* — Jerry Lorengo
*Assistant Examiner* — Noah Wiese
(74) *Attorney, Agent, or Firm* — McGlew and Tuttle, P.C.

(57) ABSTRACT

The invention relates to the building material industry and to the use of labor saving tools of industrial continuous and batch brick kilns. Said invention makes it possible to develop a process for producing large-sized clay ceramic products consisting in carrying out rapid and high-quality baking and to accelerate a construction process. The inventive method for producing a clay house or another clay construction consists in forming, during construction, through and blind voids in a wall and a ceiling in such a way that they are closed with a noncombustible material from outside, in covering window and door apertures in the ready clay construction with a noncombustible material, and in baking the construction to a ceramic state in such a way that hot gas penetrates into the voids and that the body of the product is uniformly heated. During baking the construction is used in the form of a furnace (combustion chamber).

14 Claims, 3 Drawing Sheets

U.S. PATENT DOCUMENTS

| | | | |
|---|---|---|---|
| 6,331,105 B1 * | 12/2001 | Lee | 425/324.1 |
| 6,588,484 B1 * | 7/2003 | Fosaaen et al. | 164/28 |
| 6,983,571 B2 * | 1/2006 | Felton | 52/309.13 |
| 2006/0121247 A1 * | 6/2006 | Sakai et al. | 428/141 |
| 2006/0208381 A1 * | 9/2006 | McNear | 264/69 |

FOREIGN PATENT DOCUMENTS

| | | |
|---|---|---|
| RU | 2023826 C1 | 11/1994 |
| RU | 2 035 301 C1 | 5/1995 |
| RU | 1 1237 U1 | 9/1999 |

* cited by examiner

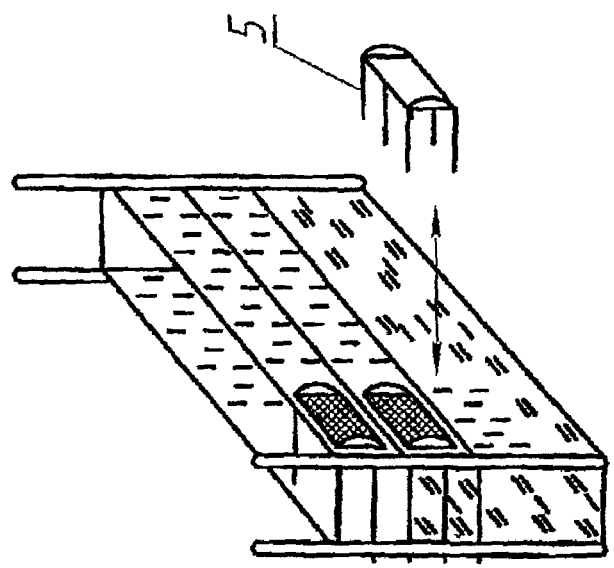
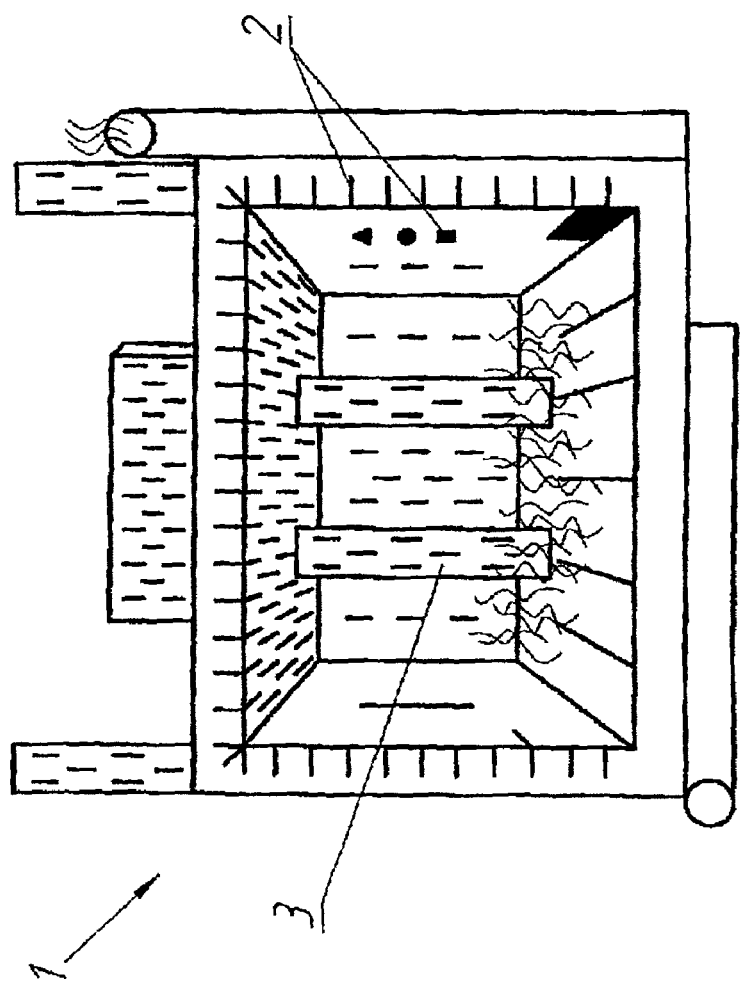

GENERAL-PURPOSE METHOD FOR PRODUCING LARGE-SIZED CERAMIC PRODUCTS SUCH AS HOUSES OR ROOMS FROM CLAY, LARGE-SIZED BLOCKS, BRICKS, AND CEILING SLABS

FIELD OF THE INVENTION

The invention relates to the building material industry and to the use of devices and tools of industrial continuous and batch brick kilns.

DESCRIPTION OF THE PRIOR ART

The existing method for building structures from ceramic bricks is costly and labor-intensive, and carries numerous risks. The risks include inconsistent brick quality, wastage (such as breakage, overburning, and underburning), and loss in carriage and construction.

A prior art method for building houses from adobe (clay mixed with straw) is advantageous because of its simple process and low costs (local materials are used in construction). Houses built with the use of this method have drawbacks such as low moisture resistance and low bearing capacity. These drawbacks are corrected by subjecting a structure to heat treatment until it acquires a ceramic condition.

Another prior art method is used for building houses from clay (adobe) in a sliding formwork by building up the walls. It is disadvantageous, however, because of slow clay drying.

The traditional technique for producing ceramic items comprises molding an adobe brick, drying it, and firing it. Standard bricks, however, have small dimensions, and building houses from them requires considerable labor inputs and much time.

A further prior art method for making large-sized cast-in-place ceramic blocks and panels with voids comprises preparing a plastic mass, shaping a bar, cutting up the bar into raw blanks, placing the blanks on a fireproof tray, the blanks in the first row being placed in close contact with one another, their contacting surfaces being covered with a mortar such as cream-like clay, and the blanks in the next row being placed crosswise out of contact with one another so as to produce voids between them, whereupon the rows are alternated until the panel or block attains the required thickness, the tray being then advanced through the passage of a tunnel kiln (see: Patent RU No. 2,035,301, published on May 20, 1995). It takes much time and large labor inputs to place the blanks in position, and firing requires a considerable length of time as the blanks have a heavy weight and the voids are closed on all sides to hot air.

SUMMARY OF THE INVENTION

It is an object of this invention to develop a general-purpose process for producing large-sized ceramic items from clay, both houses and other structures, and also very large blocks and slabs, which process allows rapid and high-quality firing to be effected and construction to be accelerated.

The technical result of this invention consists in simplifying formation of a raw product and accelerating the baking thereof by allowing heated air to enter the product voids.

This technical result is achieved by a method for producing large-sized ceramic items in a first embodiment of the invention relating to the construction of a house or another structure from clay, wherein blind or through voids covered from outside with a noncombustible material during the firing thereof and extending through the body of the walls and ceiling of a clay structure are provided from inside during construction thereof, and the item is fired from inside until it acquires a ceramic condition by allowing hot gas to enter the voids.

As an illustration, a wall may be faced with glass or plastic tiles that transmit solar radiation so that the outer face of the wall is heated and the air heated under the tiles expands into the voids.

Voids may also be formed with the use of wedge rods extending at different angles.

The exhaust pipe is to be positioned during the firing process so that the inlet end thereof is 50 cm above the floor level.

The technical results is also achieved in a method for producing large-sized ceramic items according to a second embodiment of this invention relating to the production of large-sized blocks, bricks, floor slabs, and other items intended for use in building a house or another structure, the products are molded, blind or through voids covered from top with a noncombustible material during the firing process so that when the bricks or blocks are properly positioned in the structure the voids are on the wall surface, and the item is so positioned during the firing process with the voids facing down above the fire so that the item serves as the ceiling of the kiln to allow hot gas to enter the voids, and firing continues until the item acquires a ceramic condition.

In an illustrative example, as bricks or blocks are placed in the proper position in the structure the wall is faced with glass or plastics tiles transmitting solar radiation for heating the outer face of the wall and allowing the air heated under the tiles to expand into the voids.

Voids may also be formed by wedge rods extending at different angles. Also, as an item is molded, it is provided with an artistic pattern so that the wall does not require facing later on.

DESCRIPTION OF THE DRAWINGS

FIG. 1 shows diagrammatically the firing of a house of clay.

FIG. 2 shows diagrammatically the making of voids during construction of a house.

DESCRIPTION OF AN EMBODIMENT OF THE INVENTION

Figure 3:
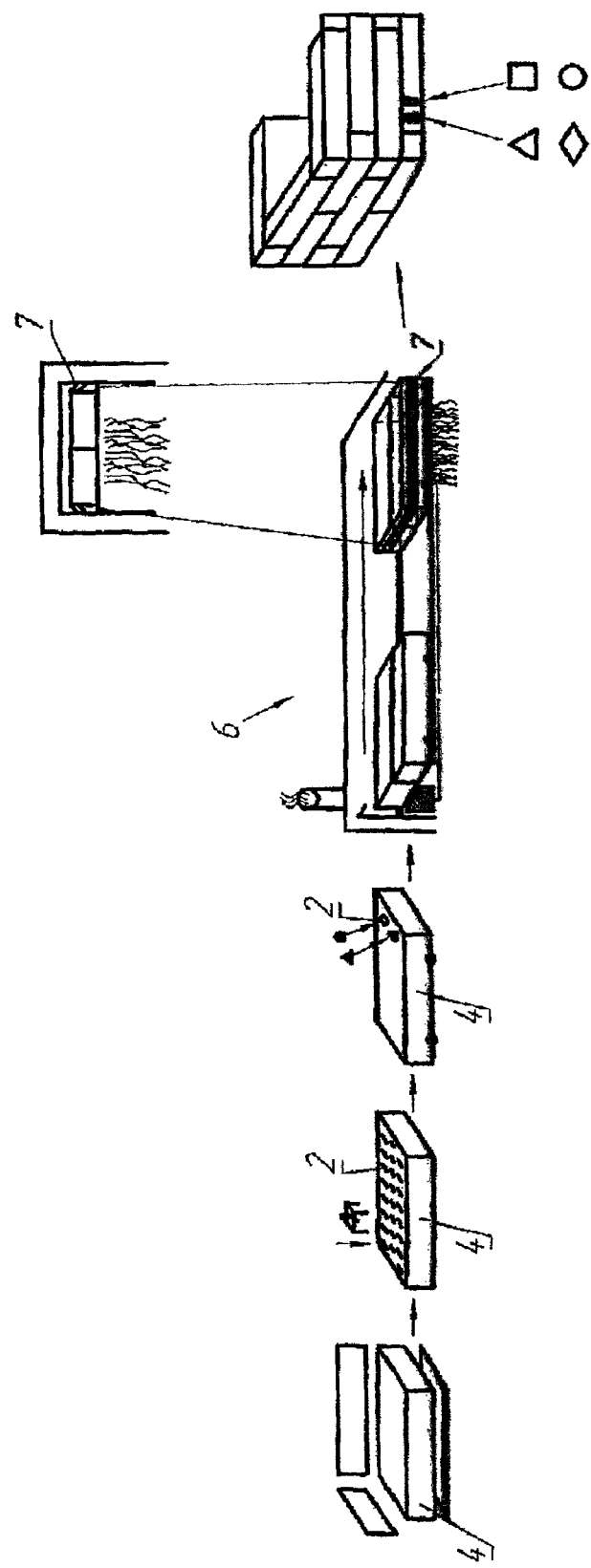
FIG. 3 shows diagrammatically the process for producing a large-sized block.
Figure 4:
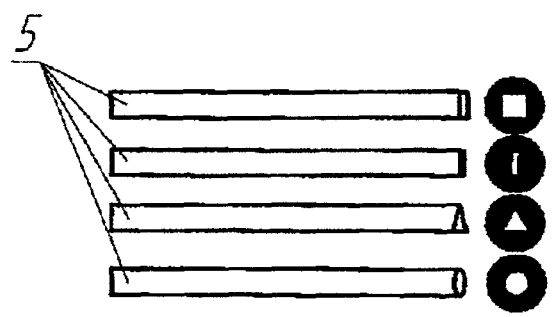
FIG. 4 shows different types of rods used to make voids.
Figure 5:
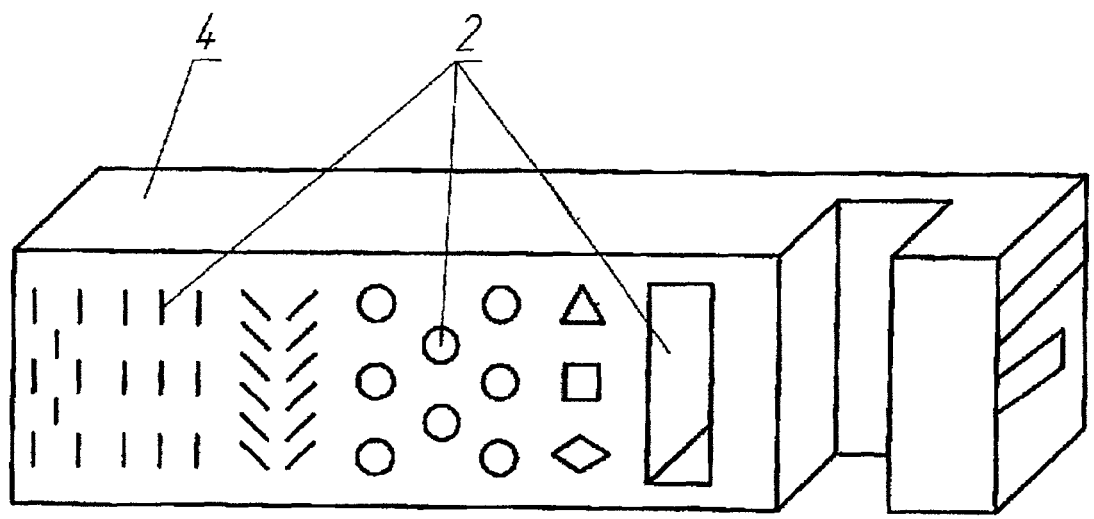
FIG. 5 shows a part of a large-sized block provided with voids of different shapes.

The method for producing large-sized ceramic items is carried out as follows:

According to the first embodiment of the invention, a house is constructed from clay in a sliding formwork by building up a wall (see: FIG. 2). As a clay structure 1 (a house or another structure) is built, voids 2, either blind or through, closed on the outside with a noncombustible material, are provided in the body of the walls and ceiling. Once the clay structure is finished, its windows, doorways, and other openings are also closed off with a noncombustible material. The ceiling may rest on supports 3 such as refractory metal girders, although the best supports are clay items (such as large-sized bricks, columns, and the like) that are, upon completion of the firing, removed outside, to the second floor.

The firing process is carried out from inside. The structure becomes a kiln (combustion chamber) for the duration of the firing process. The exhaust pipe has its inlet at a distance of approximately 50 cm from the floor level (kiln hearth). It is common knowledge that hot air rises while cold air goes down. Accordingly, cooler air will enter the exhaust pipe, so fuel economies will be achieved. The exhaust pipe may be of a knockdown type, or made from metal sheets, asbestos or other noncombustible materials. The pipe is 100 cm in diameter and over 500 cm in height, depending on the quantity of fuel burned per time unit.

According to the second embodiment of the invention, the same process is used to produce ceramic items of unlimited dimensions and shapes. If the walls of a house plan are divided up into sectors, bricks or blocks, and these large-sized bricks are molded and fired separately, the walls of a private house (cottage) can be put up in a single day, provided a crane is used.

In both embodiments of the invention, voids are formed by wedge rods 5 in low-elasticity (thick) clay.

As a house is put up, the wedges are inserted into openings of the formwork or forms of desired size, and the formwork is filled with clay that is packed once it has been placed in the formwork. The wedges are withdrawn from the underlying row after another row has been placed over it.

To make bricks, a form of desired dimensions is filled with clay, whereupon voids are formed in the item body (vertically from top down or from bottom up).

Voids may be blind, but it is preferred to make them open-ended to accelerate drying. If that is the case, they are covered on top with clay or closed with a metal cap (plug) from outside prior to firing.

Wedges may be of a replaceable type discarded after use, or be provided with casing rings to prevent deformation of the item when the wedges are removed from clay. Wedges may differ widely in length and shape (circular, square, or triangular in cross-section, or of any other shape). The number and shape of voids may also differ. They may have a vertical and horizontal gradient (10 to 40 degrees).

A very thick body of clay may create conditions in which the inner layers have not been baked yet while the outer layers have started cracking and melting under the effect of high temperature. For this reason, the thickness of the clay layer between the voids is not to exceed 15 cm. If this condition is met, temperature would be distributed more evenly. As an example, a brick may have a height of 70 cm, thickness between 40 and 50 cm, and length of 210 cm, with voids spaced at 10 cm.

Voids may also be formed in large-sized bricks by stationary or movable presses.

After an item 4 has been molded from clay, it is dried in the air for an artistic pattern to be given to it. Molded item 4 (brick, column, or floor slab) is loaded on a truck (wheeled metal frame) and rolled into a kiln 6, in which it continues to be dried, heated, and fired.

The voids are to face down above the fire during the firing process. Shutters (flaps) 7 are inserted between the wall of kiln 6 and item 4 to prevent hot kiln air from escaping upward. Moreover, item 4 serves as the kiln ceiling while it is fired. Firing takes place in a natural manner, with hot gas rising from the kiln bottom and penetrating into the voids and heating item 4 evenly.

When the bricks are placed in position (in a structure), the voids are to be on the face of the wall so that they can be seen from outside. The voids in a fired item may be filled up. If the walls are faced with glass or plastic tiles that transmit solar radiation, the air between the tiles and wall is heated by the radiation and expands into the wall voids, heating the wall body. Heat is, therefore, accumulated and heating energy is saved.

The invention helps make a building strong (because its components are of a larger size than is accepted as normal) and durable, simplifies the building process, reduces the number of steps needed to put it up, and cuts operating costs.

The process of this invention suits all purposes since it can be used to build and fire a room, and also to fire large-sized items (bricks) that serve during the firing process as the kiln ceiling capable of moving when fresh batches of items are to be fired. This kiln-like structure can be used for incinerating garbage. The method can be used for building residential and industrial houses, outdoor heated pools, mobile houses (transformable houses), tunnels, sewage pipes, factory stacks, and road pavement slabs.

What is claimed is:

1. A method for producing ceramic products comprising:
   making blind or open voids from the inside in a body of walls and ceiling of a clay house or another structure during construction thereof, said voids being closed from the outside with a noncombustible material; and
   firing the clay house or another structure from a position inside the clay house or another structure until clay of the clay house or another structure acquires a ceramic condition, wherein hot gas expands into the voids.

2. A method as claimed in claim 1, wherein the wall is faced with glass or plastic tiles transmitting solar radiation to heat the outer face of the wall and to allow the air heated under the tiles to expand into the voids.

3. A method as claimed in claim 1, wherein voids are provided via wedge rods extending at different angles.

4. A method as claimed in claim 1, wherein an exhaust pipe is positioned so that an inlet thereof is 50 cm above a floor level.

5. A method for producing ceramic products, comprising:
   molding an item during the production of large-sized blocks, bricks, ceiling slabs, and other items intended for building a house or another structure, and making blind or open voids in a body of the item with said body closed on a top surface thereof with a noncombustible material so that the voids are on a wall surface after the bricks or blocks have been placed in a position in the house or another structure;
   positioning the item in such a manner that the voids face in a downward direction over the fire during a firing process so that the item serves as a kiln ceiling to allow hot gas to expand into the voids, and firing the item until said item acquires a ceramic condition.

6. A method as claimed in claim 5, wherein the wall surface of bricks or blocks positioned properly in the structure is faced with glass or plastic tiles transmitting solar radiation for heating the outer face of the wall and allowing the air heated under the tiles to expand into the voids.

7. A method as claimed in claim 5, wherein the voids are formed via wedge rods extending at different angles.

8. A method as claimed in claim 5, wherein an artistic pattern is given to the item as said item is molded into shape.

9. A method for producing ceramic products comprising:
   forming a clay structure comprising one or more walls and a ceiling, said one or more walls and said ceiling defining at least a portion of an interior space;
   forming one or more of blind voids and open voids on an interior wall surface of said one or more walls and an interior ceiling surface of said ceiling from a position within said interior space; and
   heating said clay structure from a position in said interior space until said one or more walls and said ceiling acquire a ceramic condition, wherein hot gas expands into the voids.

10. A method in accordance with claim 9, further comprising:
   closing one end of each of said blind voids with a noncombustible material from a position outside of said interior space with a noncombustible material, said one or more walls and said ceiling defining at least a portion of a clay house.

11. A method in accordance with claim 10, wherein said one or more walls is faced with glass or plastic tiles transmitting solar radiation to heat an outer face of the one or more walls and to allow the air heated under the tiles to expand into the voids.

12. A method in accordance with claim 10, further comprising:
   providing a form for forming one or more of said one or more walls and said ceiling;
   arranging wedge rods in said form, said wedge rods extending at different angles;
   placing clay in said form after said wedges are provided in said form, wherein said voids are formed via said wedge rods extending at different angles; and
   removing said wedge rods from said form.

13. A method in accordance with claim 10, wherein said clay structure is heated with a heater, said heater comprising an exhaust pipe, said exhaust pipe comprising an exhaust pipe inlet, said exhaust pipe inlet being arranged in said interior space such that said exhaust pipe inlet is fifty centimeters above a floor level of said clay structure.

14. A method in accordance with claim 5, wherein a thickness of a clay layer between said voids is equal to or less than fifteen centimeters.

* * * * *